United States Patent

[11] 3,573,384

[72] Inventors Panagiotis N. Konidaris
River Edge;
Richard E. Buchner, Wayne, N.J.
[21] Appl. No. 759,670
[22] Filed Sept. 13, 1968
[45] Patented Apr. 6, 1971
[73] Assignee International Telephone and Telegraph Corporation
Nutley, N.J.

[54] ELECTRONIC CROSSPOINT SWITCHING ARRAY
12 Claims, 6 Drawing Figs.

[52] U.S. Cl. .......... 179/18
[51] Int. Cl. .......... H04q 3/42, H04q 3/495
[50] Field of Search .......... 179/18.7 (YA)

[56] References Cited

UNITED STATES PATENTS

| | | | |
|---|---|---|---|
| 3,319,009 | 5/1967 | Regnier et al. .......... | 179/18 |
| 3,441,677 | 4/1969 | Erwin et al. .......... | 179/18 |

*Primary Examiner*—Kathleen H. Claffy
*Assistant Examiner*—William A. Helvestine
*Attorneys*—C. Cornell Remsen, Jr, Walter J. Baum, Percy P. Lantzy, Philip M. Bolton, Isidore Togut and Charles L. Johnson, Jr

ABSTRACT: A crosspoint switching array of four-layer semiconductor devices in which complete connection through the array is established by selecting and firing only the minimum number of crosspoints necessary for that complete connection to be made. Activation of said minimum number of crosspoints is independent of the inherent rate effect characteristics of the crosspoints devices. The crosspoint switching array provides a selection of crosspoints based on availability rather than on the device characteristics and array support equipment.

INVENTORS
PANAGIOTIS N. KONIDARIS
RICHARD E. BUCHNER
BY Menotti J. Lombardi
ATTORNEY INVENTORS
PANAGIOTIS N. KONIDARIS
RICHARD E. BUCHNER
BY [signature]
ATTORNEY INVENTORS
PANAGIOTIS N. KONIDARIS
RICHARD E. BUCHNER
BY [signature]
ATTORNEY

INVENTORS
PANAGIOTIS N. KONIDARIS
RICHARD E. BUCHNER
BY
ATTORNEY

INVENTORS
PANAGIOTIS N. KONIDARIS
RICHARD E. BUCHNER
BY [signature]
ATTORNEY

ELECTRONIC CROSSPOINT SWITCHING ARRAY

BACKGROUND OF THE INVENTION

This invention relates to electronic switching networks of communications systems, and more particularly to the arrangement and control of crosspoint switching arrays for the systems.

There exist many communications systems having crosspoint sys arrays or matrices as h the switching element. One arrangement of a crosspoint switching array is to have the transmission paths sitau situated in vertical and horizontal groups with the intersection of each vertical group and horizontal group forming a coordinate matrix. At the intersection of vertical and horizontal transmission paths within the cor coordinate matrix is placed a bistable crosspoint device which in its high conductivity state represents a completed connection through that part of the array.

When the relays are employed as crosspoint dr deiv devices, there may be one such device associated with each intersection of a vertical horizontal group of transmission lines, with the contacts of that relay representing the acu actual crosspoint devices at intersections within the coordinate matrix. There are several important disadvantages regarding the use relays as crosspoint devices. Whenever service is requested of the array, subsequent energization of any particular relay involved in that service will result in each set of contacts thte thereof becoming closed, and other connections will have been established within the associated coordinate matrix than merely the desired connection. Additional lines and contacts are generally needed for energizing the relay and holding it in the energized state. Size and weight become cric critcially significant critically significant factors as the size of the syt system becomes large, and the there are large current requirements associated with relays.

In crosspoint switching arrangements previously used involving semiconductor devices, and in particular bistable breakdown devices, switching networks included a series of stages between two groups of terminations, each stage having a l plurality of bistable breakdown devices and in some cases requiring a bias supply with each device. Each stage into the network from either group of terminations generally included a greater number of crosspoint devices than the preceding stage.

One disadvantage of many such arrangements is the e need for energizing a particular crosspoit crosspoint more than once in the establishment of a completed path through the network. Additionally, previous methods and arrangements involving bistable breakdown crosspoint devices have the common disadvantage that many more crosspoints are energized than are necessary in any one attempt to complete a connection, and each bistable breakdown device which can be considered related to or part of the same section or stage of the switching array must have unique rate effect/ breakdown voltgage characteristics.

SUMMARY OF THE IV INVENTION

A communications system is provided having a crosspoint switching array of four-layer (bistable breakdown) semiconductor devices wherein a complete connection through the arry is established by preselecting only the minimum number of idle crosspoints necessary to complete that connection and then firing only those crosspoints sequentially in a manner which is not dependent on the inherent rate effect characteristics of the crosspoint devices. Such a switci switching array is realized in the present invnei invention by having the transmission paths of the array arranged in intersecting vertical and horizontal line formations hereinafter referred to as coordinate matrices. The coordinate matrices are arranged in a minimum of three sections, a primary section connected to the input (line/tur through line/trunk) transmission paths, a secondary section connected to the transmission paths leading to theo the output terminal circuits, and at least one intermediate section between the primary and secondary sections interconnected to each through the internal tras transmission paths of the arry array.

With the elimination of the dependency upon inherent rate effect characteristics in firing four-layer crosspoint devices, there no longer exists a need for the requirement that each crosspoint of any particular part of the array have a firing characteristic unique from all others within that part. Firing of four-layer devices may instead be based on breakdown voltage characteristics whereby activation is achieved whenever the absolute value of voltage between proper terminals reaches the designated breakdown level. An ann array may, therefore, be created wi wherein all crosspoints have about the same (within well-defined limits) breakdown voltage characteristics, such design requirements representing a considerable reduction from the circ critical requirements of uniqueness heretofore demanded of manufacturers regarding previous switching array arrangements.

A desirable feature of the invention is that preselection of crosspoints is based on availability (idleness), as opposed to the crosspoint device characteristics (pseudorandom selection). As a result only the desired crosspoints fire in an t attempt to establish a connection through the array. Positive sl selection of the crosspoints enables an accurate determination as to current generation requirements of the terminal and support circuitry. Current generators no longer need be designed to produce many times the required maximum sustaining current to achieve a connection; and crosspoint devices having av about the same maximum current-carrying characteristics may be used exclusively to construct such a switching array.

It is therefore an object of this invention of to provide a reliable, noncritical semiconductor crosspoint switching array whereby only the minimum number of crosspoints necessary for establishment of a complete connection through the array is activated.

Another object of this invention is to provide a switching array whereby each of the said reui required minimum number of crosspoints is preselected, on the basis of availability, with subsequent firing thereof independent the inherent rate effect characteristics of the crosspoint devices.

It is a further object of this invention to provide a switching arrangement having efficient through minimal array marking and support equipment.

It is yet another object to eliminate the necessity or presence of large currents.

When a request for service (a incoming call) is made to a communications system having its switching apparatus according to the present invention, there immediately results a search for and marking of terminals and terminal equipment to the switching array. By vit virtue of the origin of the rqu request o for service, it can be assumed that the line/trunk into the switching array is ald already chosen and the input terminal to the switching array established. The request in this case merely triggers the line/trunk bias generator to apply the necessary input bias potential to the switching array.

With regard to the output terminal of the switching array, the initial request for service also initiates a search by the system for an idle output terminal (allot) and output terminal circuitry, hereinafter referred to as a link circuit. The selected link circuit applies a bias potential to its associated array output terminal, of similar value but opposite polr polarity to the bias presented to the input terminal.

The bias potentials are passed to the array scanner control input circuitry via line dependent and link dependent control gating circuitry respectively. Exise Existence of both biases activates the array scanner control, resulting initially in the generation of a signal which advances the array scanner to its next coordinate matrix group designation. This signal is hereinafter referred to as array scanner advance (A.S.A.). After a well-defined period of time, the array scanner control generag generates a signal hereinafter referred to as array scanner enable (A.S.E.), permitting the scanner to produce an output to the newly selected coordinate matrix groupl group.

The bais generated by the line/trunk circuit, having been passed via the control gating circuitry, is received also by the the array gating circuitry. Included htere therein is an AND-gated amplifier requiring, in addition to the bias input from the control gatig gating circuitry, a second input in the form of the above-mentioned output from the array sa scanner, hereinafter referred to as matrix group pulse (M.G.P.).

the The presence of both inputs enables the array gating circuitry of that coordinate matrix group to allow the crosspoint firing d sequence to begin. Establishment of a complete connection is acknowledged by the link circuit in the form of a generated signal (completed call signal or C.C.S.) to be received by the array scanner control which would then be inhibited from any further action on that one call.

Had this completed call signal not been recieved, the array co scanner control would, after a second well-defined time period, repeart repeat its function of advancing the scanner to the next position and subsequently activating it. This function continues until A a C.C.S. is received or until all scanner steps have been attempted without success, whereupon the system then selects another link circuit and the entire process is repeated.

BRIEF DESCRIPTION OF THE DRAWINGS

The above-mentioned and other objects and features of this invention and the manner of attaining them will become more apparent and the invention itself will be best understood by reference to the following description of an embodiment of the invention taken in conjunction with the accompn accompanying drawings comprising FIG. FIGS. 1—6 wherein:

FIG. 1 is a block diagram of that portion of a communications system including the switching array, illustrating the relation relation between the switching array and asscoiated support circuitry;

FIG. 2 is a schematic diagram of the transmit array portion of the switching array with control gating circuitry, array gating circuitry, and interconnecting (internal) and terminal transmission paths included;

FIG. 3 is a schematic diagram of the array scanner control illustrating the inputs and associated circuitry governing its operation and the closed loop of single shot multivibrators which controls the array scanner;

FIG. 4 is a graphical representation showing the control loop l pulse sequence of the array sacnner control which governs the array scanner;

FIG. 5 is a schematic diagram of the array scanner showing a conventional sequential scanning network comprised of flip-flops and AND gates; and FIG. 6 is a schematic diagram of the receive array portion of the switching array, from which is shown the complete symmetry which exists between transmit and receive arrays.

DESCRIPTION OF THE PREFERRED EMBODIMENT

Figure 1:
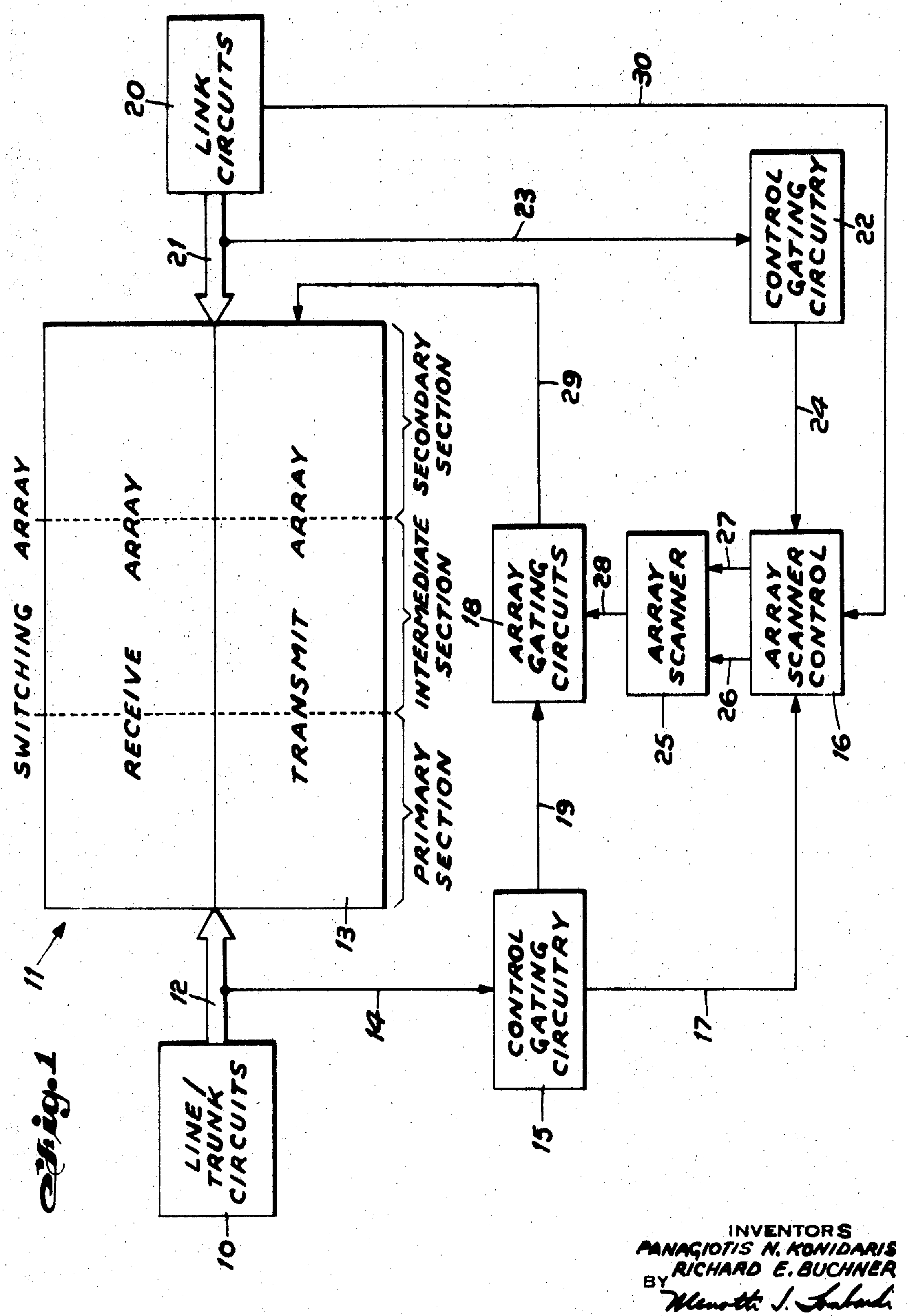

FIG. FIG. 1 illustrates the the present invneit invention in block form, w showing the switching array and its support circuitry operatively located between the system line/trunk a circuits and link/circuits. The blocks representing the line/trunk circuits (the words line and trunk hereinafter may be used interchangeably) and the link circuits may be considered to include transmission paths and any necessary well-known marking/biasing circuitry. The switching array is shown with separate transmit and receive arrays, with each having a primary, secondary, and one intermediate stage. In view of the complete symmetry between and operation of the transmit and receive arrays, only the tranm transmit array will be discussed in detail.

When a request for service is detected by the array scanner control from the biases generated by the terminal circuits and passed to the array scanner control via the control gating circuitry, the array scanner is automatically instructed to sequentially search for idle paths through the array. Upon acquisition of an idle path, which involves the array gating circuitry, the crosspoints constituting the path are engaged in the firing sequence which places them in the high conductivity state, forming thus a complete connection through the array. In an array arranged in three sections this complete path would include the terminal transmission paths, one crosspoint from one of the coordinate matrices of each section, and the two interarray transmission paths located between the selected coordinate matrix crosspoints. The order of firing of thep the pertinent crosspoints commences with these the secondary section, and proceeds in order to the primary section crosspoint whose firing completes the connection from the aprty requesting service (caller) to the output terminal circuit (link circuit).

Though complete symmetry exists between arrays, the receive array is completely dependent on (a slave) the transmit array. At particular pi points, the transmit and receive arrays are interconnected such that whev whenever the proper conditions and voltages are applied to the turn transmit array the receive array is similarly treated. The receive array is considered a slave in that there are no connections to any bias sources othen the other than the interconnections mentioned above. The result is that selection and subsequent activation of particular crosspoints in forming a complete connection through the transmit array, simultaneously yields the same path in the reci rev receive array.

In FIG. 1, the line/trunk circuits 10 may represent, for the prup u pru purposes of example, telephone lines with appropriate bias genea generatros generators. An incoming call is initially sensed by the line circuit which immediately marks that line, placing a bias on the line's input to the switching array 11 via interconnecting line 12. The bias generated by the line circuit 10 is also coupled by line 14 to control gating circuitry 15 which responds to this bias by generating two outputs. One output is coupled to the array scanner control 16 by line 17, and the other output is passed to the array gating circuitry 18 by line 19.

At the same time the system sequentially searches for an idle link circuit 20. This search is terminated when the system receives a return signal from the first available (idle) link circuit interrogated. As with the line circuit 20, 10, the chosen link circuit 20 marks an output line 21. The bias generated by link circuit 20 is also received by control gating circuitry 22 by way of line 23. The output 24 of the control gating circuitry 22 is coupled to the array scanner control 16. Receipt of signals from lie lines 17 and 24 causes the array scanner control 16 to generate a signal to the array scanner 25 on line 26. The signal on line 26 causes the array scanner 25 to be advanced to the next step. After a predetermined time the array scanner control 16 generates a command signal on line 27 permitting the scanner 25 to generate an output 28 in the form of a matrix group pulse (M.G.P.). This group pulse is one of the two input conditions required by the array gating circuitry 18 to permit the firing sequence of crosspoints to begin. With both inputs present from lines 29 19 and 28, the array gating circuitry generates a voltage on line 29 to the secondary section presenting sufficient voltage across the pertinent crosspoint to achieve breakdown, resulting in a connection through that section of the array. Firing of the secondary section crosspoit crosspoint results in the required breakdown voltage being placed across the desired intermediate section crosspoint, with activation of same permitting, in a like manner, the desired crosspoint of the primary array to fire. A successful completion of the above connection is acknowledged by the link circuit 20 by generating a completed call signal on line 30, which automatically inhibits the scanner control 16 from further action on that particular call.

Figure 2:
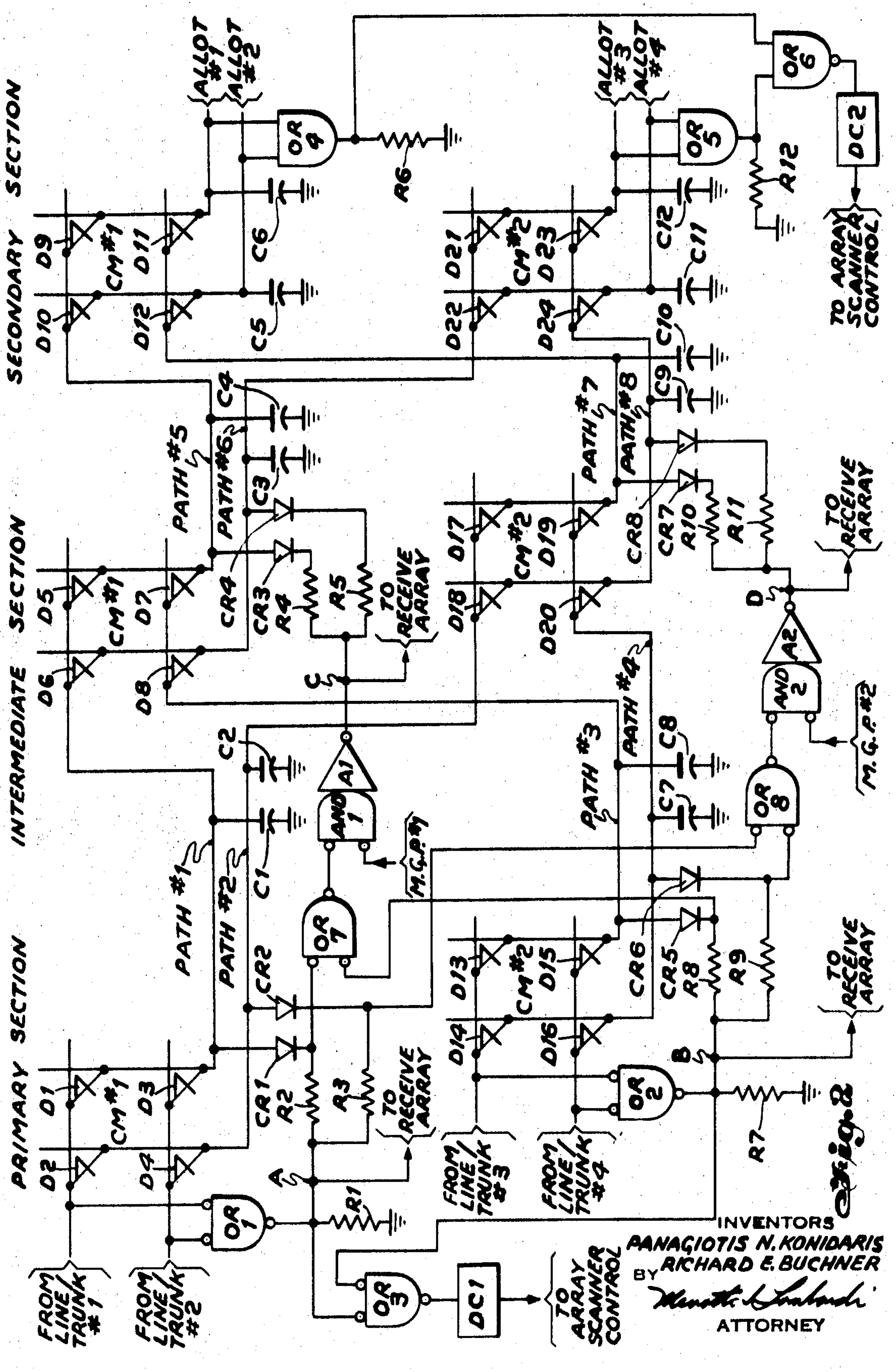

FIG 2 represents a detailed schematic diagram of the transmit array showing the minimum circuitry (2 × 2 coordinate matrices) required in order to explain the principles of operation of the present invention. As shown, the primary section represents all the coordinate matrices (C.M.'s) connected to the input connec transmission lines from the lines/trunks, the secondary section represents all coordinate matrices connected to the output transmission lines leading to link circuits (designated allots), and the intermediate section represents those coordinate matrices which are interconnected to the coordinate matrices of the other sections by intra-array transmission paths in the form of paths 01 through 08. The transmit and receive arrays are it interconnected at points A, B, C and D. A coordinate matrix group, as illustrated in FIG. 2, is hereby defined as all like-numbered coordinate matrices and the circuitry associated therewith which includes a line dependent control gating circuit, and an array gating circuit, for example, in FIG. 2 all coordinate matrices designed C.M. 01 and associated circuitry OR 1 and theco the combination of OR 7, AND 1 and A1 constitute coordinate matrix group 01.

With t regard to all circuit circuitry in the figures containedi contained in this specification, a small circle at an input or outpt output terminal indicates that the lower of two logic (voltage) levels is operatively associated with that terminal. The absence of such a circle indicates that the higher level is required for operation. In the case of gate OR 1 of FIG. 2 for example, both inputs have v circles, indicating that the lower level is required in both cases for any action to occur. The lower level in this case is the negative bias generated by thea the associated o line circuit, and the higher logic level would then be zero volts. The output of OR 1 also has a circle indicating that the desired output, if a correct input exists, will be of negative lg logic (lower logic level).

In describing the present invention in detail, it is to be assumed that the last attempted call was completed and the array scanner control received the completed call signal from the appropriate link circuit. A new request for service is received on line 01 and the system selects the link circuit associated with allot 01. The line circuit bens generator of line 01 produces a negative bias of −V volts which is coupled to the associated line dependent control gatig gating circuit, OR-gate OR 1, and the interconnected terminals of four-layer semiconductor crosspoint diodes D 1 and D 2. The chosen link circuit generates a +V volt bias which is coupled via line allot 01 to the associated link dependent control gating circuit OR 4 and to the interconnected terminals of four-layer diodes D 9 and D 11, with capacitor C 6 becoming charged to this voltage.

In receiving the +V from allot 01, the resultant signal from OR 4 is applied to the array scanner control through OR 6 and differentiating circuit DC 2. Similarly, the output of OR 1 is applied to the array scanner control through OR 3 and differentiating circuit DC 1. This output was developed across resistor R 1, and was simultaneously applied to the receive array at point A, and to resistors R 2 and R 3. The voltage on R 2 and R 3 is passed to OR 7 or and OR 8. In addition, it is used to sense path 01 and path 02, respectively, as part of the preselection feature of the present invneit invention. If path 01 is not busy, −V will be applied through OR 7 to AND-ate AND 1. Assuming this to be the case, −V is then also applied through diode CR 1 to path 01 and to the associated interconnected terminals of four-layer diodes D 5 and D 6, with capacitor C 1 becoming charged to that value. Upon receiving pulses from differentiating circuits DC 1 and DC 2, the array scanner control instructs the array scanner to advance to the next step and generate an output. Assuming that the scanner was last in step M.G.P. 02, it would then be advanced to M.G.P. 01, and that matrix group pulse subsequently received by the appropriate array gating circuit consistig consisting of AND 1 and amplifier A 1.

The output a of amplifier A 1 is of the value −V and is simultaneously applied to the receive array at point C and to resistors R 4 and R 5. Assuming path 05 is not busy, the −V across R 4 is applied through diode CR 3 to path 05 charging up capacitor C4, and to the interconnected terminals of four-layer crosspoints D 9 and D 10. C 4 attempts to charge up to −V. However, being that the absolute difference of potential between −V and +V is greater than the breakdown voltage characteristics of each of the crosspoints contained in the array, and due to the fact that the anode of D 9 is at +V potential, this crosspoint will fire when its bread breakdown voltage is reached and before C 4 can reach −V. No other crossponi crosspoint of that coordinate matrix will be activated as the required breakdown voltage was not appi applied to them. The application of voltages br is such that the rate effect characteristics o of the crosspoint devices may be ignored in this firing process.

Activation of D 9 places +V on path 05 and C 4 attempts to charge to this value. However, the cathode of D 5 is at a potential of −V; and with the firing of D 9 causing C 4 to charge to +V very rapidly as a result, the breakdown potential is soon reached across D 5 and it too fires. This results in a positive potential being applied to path 01 and capacitor C 1, with D 1 firing shrotly thereafter by the same process. The firing of D 1 completes the connection through the array from line 01 to allot 01 via the three four-layer diodes D 1, D 5, and D 9. as illu As illustrated in FIG. 2, this is the medium minimum number of crosspoints necessary to complete a connection for a three-section array. Following the successful connection, the link circuit involved generates the completed call signal.

Figure 3:
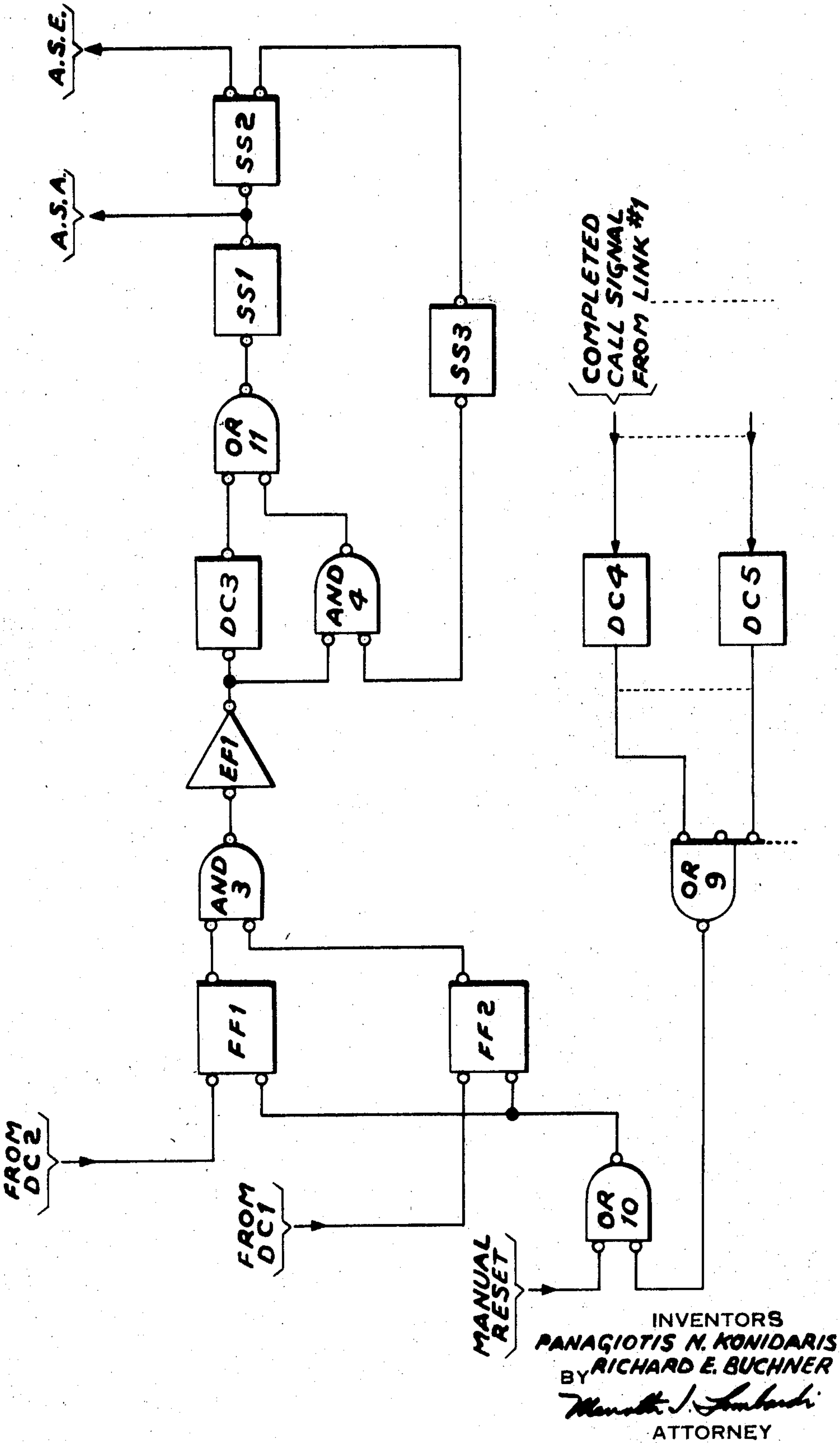

In FIG. 3, the array sa scanner control is chematically represented, with thev the various inputs from the line and link terminal circuits, as well as outputs to the array scanner, clearly shown. The inputs from DC 1 and DC 2, as hereinbefore described, are the results of the determination and the selection of particular line and link circuits respectively. Differentiating circuit DC 1 applies a negative pulse to flip-flop circuit FF 2 which sets FF 2 and prines primes AND 3. A similar pulse is applied to FF 1 from differentiating circuit DC 2 which sets FF 1 and enables AND 3. With AND 3 fired, single-shot multivibrator SS 1 also fires, generating the array scanner advance pulse (A.S.A.). The triggering pulse is coupled to SS 1 by way of emitter-follower amplifier EF 1, differentiating circuit DC 3, and OR 11.

After a well-defined period of time, based on the parameters of its circuitry, SS 1 returns to its original state which automatically fires SS 2, generating thereby the array scanner enable pulse (A.S.E.) which permits the scanner to produce an output. Generation of the A.S.E. pulse begins a second well-defined time period in which there is sufficient time to complete a path through the array, and a C.C.S. received. Failure to complete a path in this time period results in SS 2 returning to its original state which automatically activates SS 3. The resultant output pulse is applied to AND 4 which, having ben been already primed by EF 1, is then enabled. The output of AND 4 again enables OR 11 and begins anew the process described above, with the scanner being advanced to its nes next step and subsequently being permitted to produce an output.

The closed loop of SS 1, SS 2, SS 3, AND 4, and OR 11 will continue to advance and enable the array scanner until the output of EF 1 is removed from AND 4. This is accomplished by an incoming CC C.C.S. from the chosen link circuit. This signal is passed to FF 1 and FF 2 by eay of OR 9 and OR 10, resetting the flip-flops to their original state. AND 3 is not l no longer primed and therefore EF 1 is no longer able to supply an output to prime AND 4. The C.C.S. may be duplicated in manual form by the manual reset input o to OR 10.

Figure 4:
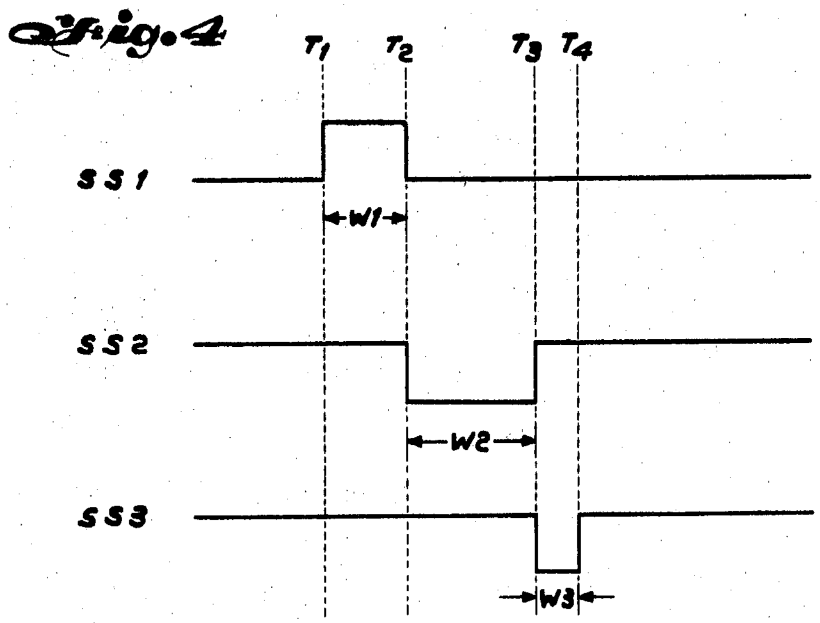

FIG. 4 shows the sequence of pulses and time relations involved in the closed loop of the array scanner control single-shot multivibrators in governing scanner operation. When SS 1 is placed in its temporary state it remains thus for a time T 2 − T 1, with a pulse of definite width W 1 being produced. The leading edge of pulse W 1 constitutes the A.S.A. signal to the array scanner. The trailing edge is the triggering condition of SS 2. The resultant pulse generated by SS 2 has a time duration of T 3 − T 2 with a pulse width of 0 W 2. Its leading edge represents the a A.S.E. signal to the array scanner. The trailing trailing end edge of W 2 becomes the trigger that fires SS 3, whose output, a narrow negative pulse of width W 3 and time duration T 4 − T 3, renews the above sequence if conditions permit.

Figure 5:
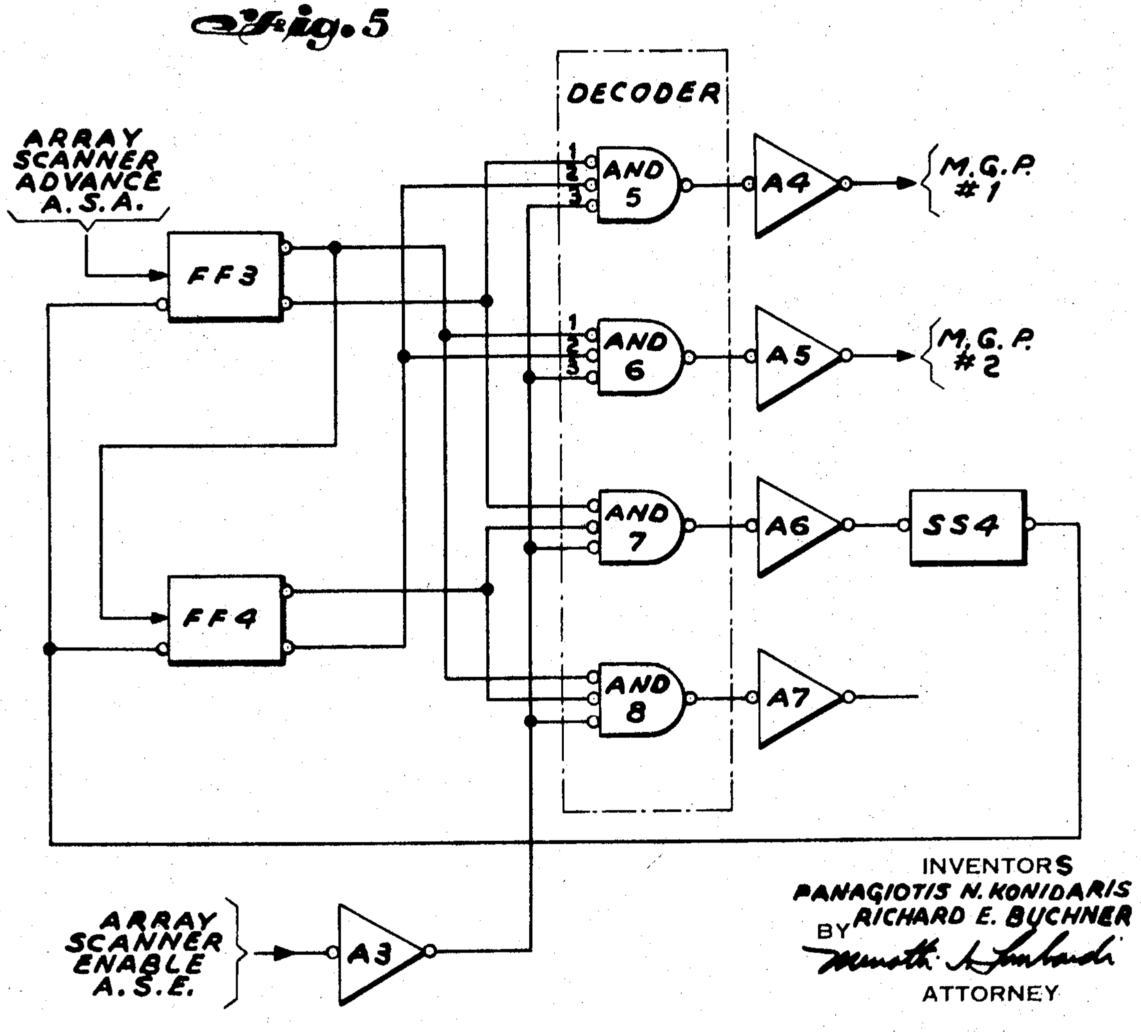

FIG. 5 shows the arrangement of circuits comr comprising the array scanner including the logic arrangement of flip-flops, and the arrangement of decoder AND-gate circuits, as well as the inputs from the array scanner control. In as much as FIG. 2 illustrated the minimum of circuitry required in describing the operation of the present invnei invention, FIG. 5 represents a similar minimum, as the extent or size of the scanner is entirely dependent on the size of the switching array, and specifically is a function of the number of coordinate matrices comprising the intermediate section of the array. It is necessary, therefore, to shown show only two scanner outputs (M.G.P. 01 and M.G.P. 02), but it should be obvious that there can exist additional steps (outputs) merely by adding flip-flops and AND-gates, or moving the position of the automatic reset, i.e. single-shot multivibrator SS 4. The existence of AND 8 and A 7 illustrates a way in which additional outputs may be obtained. Depending on the state of FF 3 and FF 4 at any particular time, one of the decoder AND-gates will be completely primed and awaiting the S. A.S.E. signal from the array scanner control which will be received from amplifier A 3. In the case of AND 7, the A.S.E. signal will reset flip-flops FF 3 and FF 4, to the beginning of the logic sequence.

Specifically, let it be assumed that that the last series of A.S.A. and A.S.E. pulses reset the flip-flops by enabling AND 7. The next incoming A.S.A. pulse will trigger FF 3 giving an overall logic ocn condition that primes AND 6 at inputs 1 and 2. Following the well-defined time period subsequent to the A.S.A. pulse, the A.S.E. pulse is received which enables AND 6, producing M.G.P. 02 output from amplifier A 5. A second series ofar of array scanner control pulses would result in the M.G.P. 01 output being generated via automatic reset single-shot SS 4.

Figure 6:
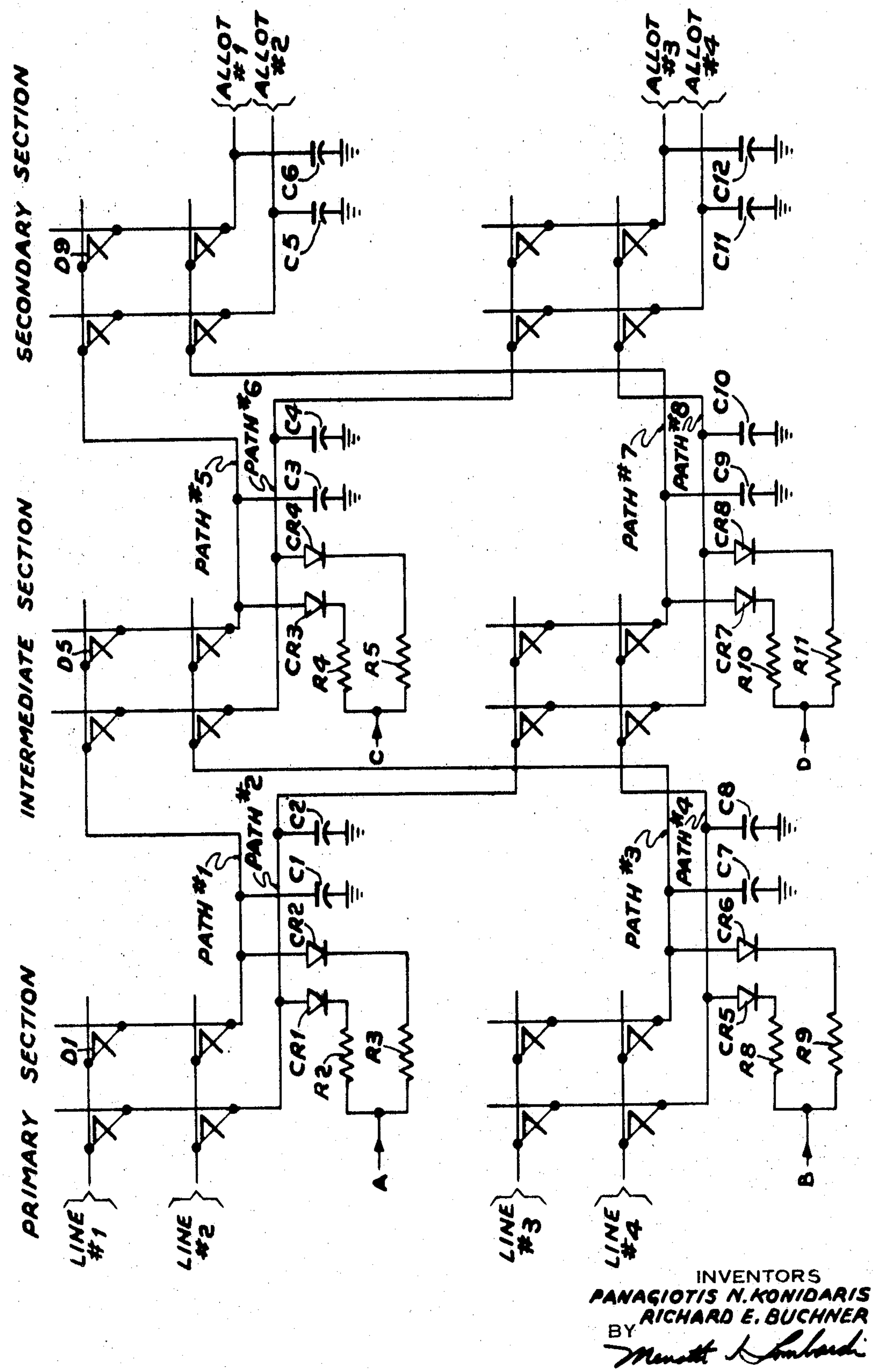

The receive array shown in FIG. 6 is completely symmetrical in the transmit array, and by virtue of the the interconnections between the arrays at points A. A, B, C, and D, the preselection and activation of a particular path in the transmit array will result in activation of the same path in the receive array, given the existence of the necessary terminal conditions. Thus the activation f of crosspoints D 1, D 5, and D 9 in the transmit array will bring about the identical path through the treceive array.

In the example hereinbefore given to describe FIG. 2 in detail, the —V voltage also across resistor R 3 was not considered. Assuming that path 02 as well as path 01 were idle, the —V would have been applied to AND 2 by way of OR 8, and path 02 would have received the —V via diode CR 2, thus charging capacitor C 2 and placing this potential on the interconnected terminals of crosspoints D 17 and D 18. However, being that the scanner was in the M.G.P. 01 step in the previous example, there could not, therefore, be an M.G.P. 02 input to AND 2 existing at the same time, and any possibility of additional paths being activated other than path 01 and path 05 already considered would be eliminated.

Consideration of cora corollary situations to the aforementioned example are required, such as those in which busy paths are encountered. Assuming that path 01 is busy, there exists a slightly positive potential on that path. the This potential would have been applied to OR 7 through diode CR 1 even as path 01 was sensed with —V. This positive potential at the input of AND 1 a from OR 7, would disable the AND-gate and inhibit amplifier A 1. This of course would have prevented the existence of the conditions necessary to fire crosspoint D 9 in the secondary section.

If path 01 had been idle but path 05 was instead busy, it would be at a slightly positiv e potential, which would again prevent secondary section crosspoint D 9 from being fired. It is to be noted that whenever a path is busy there will be no partial path firing.

It is, therefore, obvious that in a situation where either or both attempted paths are busy, that connection cannot be successful, and FF1 and FF 2 of FIG. 3 will remain in the set state due to the absence of a completed call signal from h the selected link circuit. SS 2 would return to its initial state, triggering SS 3, which in turn would reactivate SS 1 resulting in a new A.S.A . being generated and the array scanner being advanced to the next step. With the new M.G.P. designation another attempt at a complete connection is now made. Since the former scanner step discussed was M.G.P. 01, the present situation would involve M.G.P. 02 and, therefore, the attempt to complete the call between line 01 and allot 01 will be via path 02 and path 07, and specifi specifically through the second intermediate coordinate matrix CM 02. In the event that all steps to the array scanner have been attempted without completeing the call, a different secondary outlet must be allotted and the entire procedure repeated.

By virtue of the arrangement of the the switching array and the means of selecting and completing the connection, knowledge of which terminals to the array are involved in a s call attempt plus the particular array scanner step at the time is sufficient to automatically determine which crosspoints have fired if the call was completed, and also the defective paths i if the call attempt was unsuccessful. It should be obvious to those skilled in the art that the nature of the switching array is such that it may be operatively reversed, that is the present inputs becoming outputs and vice versa, if the terminal circuitry bias generators associated with the new im inputs have positive polarities and their output counterparts negative polarities.

We claim:

1. A communications switching system comprising:
a. array termination circuitry means including line/trunk circuits and link circuits;
b. array scanning means coupled between line/trunk circuits and link circuits, and inl including an array scanner, array scanner control means and array gating circuitry means;
c. a switching array of four-layer semiconductor crosspoints coupled between said line/trunk circuits an and link circuits, said swit switching array being subdivided into at least a primary section, an intermediate section and a secondary section, with each of said sections in turn being subdivided into a plurality of coordinate matrices of four-layer semiconductor crosspoint devices, the arrangement of which in conjundtion with said array scanning mean means permitting crosspoint activations to be independent of the inherent rate effect characteristics of said four-layer semiconductor crosspoints in establishing a connection through said switching array; and
d. an input source to said array termination circuitry means causing the response thereto said array scanning means to esta establish in said switching array a complete connection by selecting and energizing the minimum number of said crosspoints needed for a complete connection between said line/trunk circuits and link circuit circuits;

2. A communications switching system according to claim 1 wherein said switching array includes at least a transmit array and a receive array, wherein substantially complete symmetry exists between said transmit and receive arrays, and wherein said receive array is responsive to said transmit array such that activation of a connection through said transmit array will result automatically t in the activation of the same connection/in said receive array;

3. A communicato communications switching system according to claim 1 wherein the crosspoints of each coordinate matrix in said switching array are coupled together in vertical and horizontal rows in which each crosspoint has the same polarity electrode associated with a vertical row and a second polarity electrode associated with a horizontal row, wherein s each vertical row of said coordinate matrices is connected to a horizontal row of a coordinate matrix belonging to an adjacent and succeeding section of said switching array and wherein each coordinate matrix of said intermediate section has at least one interconnection to each of the coordinate matrices of the switching array sections adjacent the thereto.

4. A communications switching system according to claim 3, wherein the horin horizontal rows of said coordinate matrices belonging to said primary section represent the inputs to said switching array and wherein the vertical rows of said coordinate matrices belonging to said d secondary section constitute the outputs of said switching array.

5. A communications switching system according to claim 1 further including the control gating circuitry means, coupled between said array termination circuitry e means and a said array scanner control means, for generating output pulses to said array scanner control means in response to corresponding input pulses from said array termination circuitry means.

6. AC A communications switching system according to claim 5 wherein said control gating circuitry means include line-dependent gating mean s responsive to said line/trunk circuits and link-dependent gating means responsive to said link circuits, and wherein said linedependent gating means and said link-depenc link-dependent gating means are operatively coupled to said array scanner control means.

7. AC A communications switching system according to claim 6 wherein said control gating circuitry means include separate and identical line-dependent gating means associated with each primary section coordinate matrix, and wherein each input of the associated primary section coordinate matrix is coupled to said separate and identical line-depenc line-dependent gating means.

8. A communications switching system according to claim 6 wherein said control gating circuitry means include separate and identical link-dependent gating means associated with each secondary section coordinate matrix, and wherein each output of the associated secondary section coordinate matrix is coupled to said separate and identical link-dependent gating means.

9. A communications switching system according to claim 1 wherein a coordinate matrix of said switching array primary section is arranged with a coordinate matrix of said intermediate and secondary sections of said switching array to form a coordinate matrix group, and wherein said array gė gating circuitry means include a separate and identical gating arrangement associated with each coordinate matrix group.

10. A communi communications swti switching system according to claim 9 wherein said array gating circuitry means include input means i responsive to said array a scanner, and wherein said separate and identical gating arrangements associated with said coordinate matrix groups are sequentially printed by said array scanner in the course of a search for an idle path through a said switching array.

11. A communications switching system according to claim 9 wherein the intermec intermediate section coordinate matrix of each coordinate matrix groups group is coupled to the secondary section of said switching array via interconnections to each coordinate matric o matrix of said secondary section, and wherein said separate and identical gating arrangement is coupled to said interconnections.

12. A communications switching system according to claim 9 wherein said control gating circuitry means include line-c line-dependent gating means operatively coupled to a each of said separate and identical gating arrangements constituting the array gating circuitry means and to each output of said primary section.

UNITED STATES PATENT OFFICE

CERTIFICATE OF CORRECTION

Patent No. 3,573,384 Dated April 6, 1971

Inventor(s) P.N. Konidaris, R.E. Buchner

It is certified that error appears in the above-identified patent and that said Letters Patent are hereby corrected as shown below:

Column 1, line 11, delete "sys" and "h";
line 13, delete "sitau";
line 17, delete "cor";
line 20, delete "dr deiv";
line 23, delete "acu";
line 28, delete "thte";
line 33, delete "cric";
line 34, delete "critically significant" and "syt";
line 41, delete "l";
line 46, delete "e";
line 47, delete "crosspoit";
line 63, change "arry" to --array--;
line 67, delete "switci";
line 68, delete "invnei";
line 73, delete "line/tur through";
line 75, delete "theo";

Column 2, line 2, delete "tras";
line 3, delete "arry";
line 13, delete "ann";
line 14, delete "wi";
line 17, delete "circ";
line 23, delete "t";
line 24, delete "sl";
line 29, delete "av";
line 38, delete "reui";
line 43, change "through" to --though--;
line 51, delete "vit" and "rqu";
line 52, delete "o";
line 53, delete "ald";
line 63, delete "polr";
line 67, delete "Exise";
line 73, delete "generag";

UNITED STATES PATENT OFFICE
CERTIFICATE OF CORRECTION

Patent No. 3,573,384 Dated April 6, 1971

Inventor(s) P.N. Konidaris, R.E. Buchner

It is certified that error appears in the above-identified patent and that said Letters Patent are hereby corrected as shown below:

Column 2, line 75, delete "groupl";
(Cont'd)

Column 3, line 1, change "bais" to --bias--;
line 3, delete "htere";
line 5, delete "gatig";
line 6, delete "sa";
line 8, delete "the (first occurrence)";
line 10, delete "d";
line 17, delete "co";
line 18, delete "repeart";
line 31, delete "accompn";
line 32, delete "Fig.";
line 34, delete "relation";
line 46, delete "l";
line 57, delete "Fig. (first occurrence)", "the (first occurre
and "invneit";
line 58, delete "w";
line 59, delete "a";
line 68, delete "tranm";

Column 4,
line 8, delete "thep";
line 9, delete "these";
line 11, change "aprty" to --party--;
line 16, delete "pi";
line 17, delete "whev";
line 18, delete "turn";
line 22, change "othen" to --other--;
line 26, delete "reci rev";
line 28, delete "prup u pru";
line 29, delete "genea generatros";
line 41, delete "20,";
line 46, delete "lie";

UNITED STATES PATENT OFFICE
CERTIFICATE OF CORRECTION

Patent No. 3,573,384 Dated April 6, 1971

Inventor(s) P.N. Konidaris, R.E. Buchner

It is certified that error appears in the above-identified patent and that said Letters Patent are hereby corrected as shown below:

Column 4, line 56, delete "29";
(Cont'd)
line 60, delete "crosspoit";
line 74, delete "connec";

Column 5, line 12, delete "theco";
line 14, delete "t", "circuit", and "containedi";
line 16, delete "outpt";
line 21, delete "v";
line 23, delete "thea";
line 24, delete "o";
line 27, delete "lg";

line 35, delete "gatig";
line 51, delete "or";
line 53, delete "invneit";
line 54, delete "AND-ate";
line 64, delete "çonsistig";
line 66, delete "a";

Column 6, line 1, delete "bread";
line 2, delete "crossponi";
line 4, delete "appi";
line 5, delete "br";
line 6, delete "o";
line 14, change "shrotly" to --shortly--;
line 17, delete "as illu" and "medium";
line 23, delete "sa" and change "chematically" to --schemati
line 24, delete "thev";
line 30, delete "prines";
line 48, delete "ben";
line 51, delete "nes";
line 56, delete "CC";
line 57, change "eay" to --way--;

UNITED STATES PATENT OFFICE

CERTIFICATE OF CORRECTION

Patent No. 3,573,384 Dated April 6, 1971

Inventor(s) P.N. Konidaris, R.E. Buchner

It is certified that error appears in the above-identified patent and that said Letters Patent are hereby corrected as shown below:

Column 6, line 58, delete "not 1";
(Cont'd)
line 61, delete "o";
line 70, delete "0";
line 71, delete "a";
line 72, delete "trailing end";

Column 7, line 1, delete "comr";
line 6, delete "invnei";
line 11, delete "shown";
line 19, delete "S.";
line 23, delete "that (first occurrence)";
line 27, delete "ocn";
line 31, delete "ofar";
line 35, delete "the (first occurrence)";
line 41, delete "f";
line 56, delete "cora"
line 59, delete "the";
line 62, delete "a";
line 67, change "positiv e" to --positive--;
line 74, delete "h";

Column 8, line 8, delete "specifi";
line 16, delete "s";
line 20, delete "i";
line 24, delete "im";
line 32, delete "inl";
line 35, delete "an";
line 36, delete "swit";
line 41, delete "mean";
line 48, delete "esta";
line 52, delete "circuit" and change the semicolon to a peri
line 59, delete "t";

UNITED STATES PATENT OFFICE

CERTIFICATE OF CORRECTION

- 5 -

Patent No. 3,573,384 Dated April 6, 1971

Inventor(s) P.N. Konidaris, R.E. Buchner

It is certified that error appears in the above-identified patent and that said Letters Patent are hereby corrected as shown below:

Column 8, line 60, delete "/ (the slash)" and change the semicolon
(Cont'd) to a period;
line 61, delete "communicato";
line 66, delete "s";
line 72, delete "the (second occurrence)";
line 74, delete "horin";

Column 9, line 2, delete "d";
line 6, delete "e" and "a";
line 10, delete "AC";
line 12, change "mean s" to --means--;
line 14, change "linedependent" to --line dependent--;
line 15, delete "link-depenc";
line 17, delete "AC";
line 22, delete "line-depenc";

Column 10, line 6, delete "ge";
line 9, delete "communi" and "swti";
line 11, delete "i" and "a";

line 15, delete "a";
line 17, delete "intermec";
line 18, delete "groups";
line 20, delete "matric o";
line 24, delete "line-c";
line 25, delete "a".

Signed and sealed this 7th day of December 1971.

(SEAL)
Attest:

EDWARD M.FLETCHER,JR.
Attesting Officer

ROBERT GOTTSCHALK
Acting Commissioner of Pate